Sept. 3, 1935.  H. JUNKERS  2,012,997
SUPPORTING PROPELLER SHAFTS
Filed Dec. 11, 1928  2 Sheets-Sheet 1

Inventor:
Hugo Junkers.

Sept. 3, 1935.                    H. JUNKERS                    2,012,997
                          SUPPORTING PROPELLER SHAFTS
                    Filed Dec. 11, 1928          2 Sheets-Sheet 2
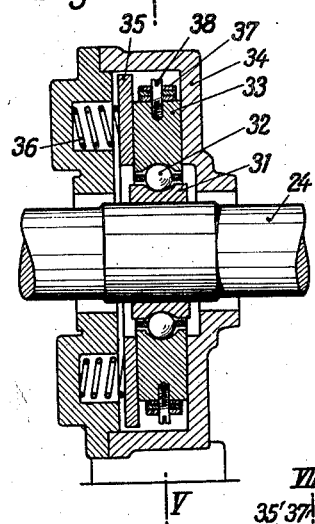
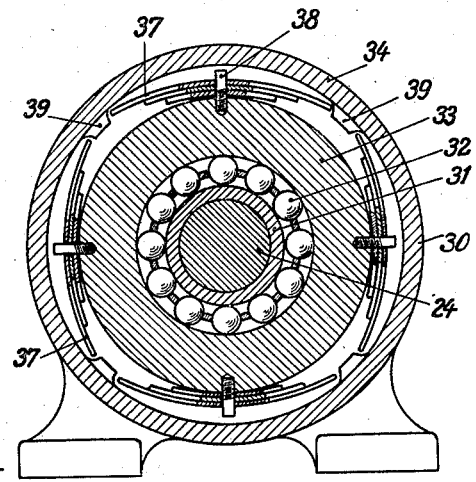
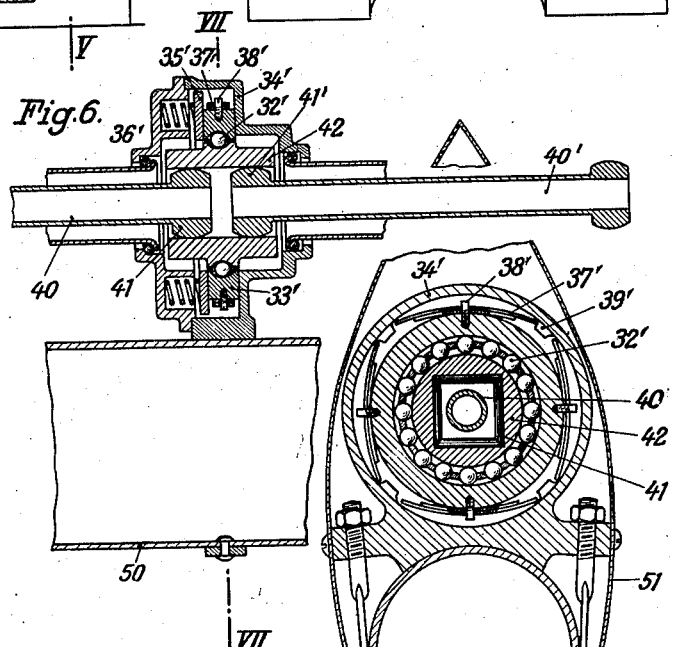
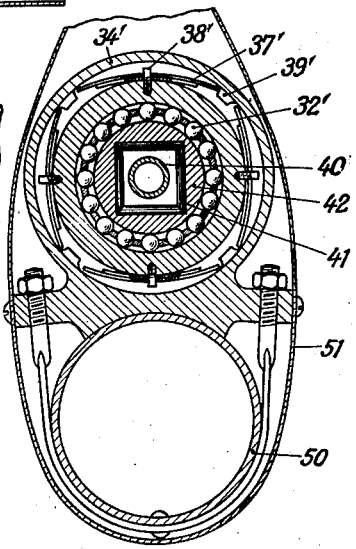
Inventor:
Hugo Junkers.

Patented Sept. 3, 1935

2,012,997

UNITED STATES PATENT OFFICE 2,012,997

SUPPORTING PROPELLER SHAFTS

Hugo Junkers, Dessau, Germany, assignor to the firm Junkers-Motorenbau G. m. b. H., Dessau, Germany Application December 11, 1928, Serial No. 325,250
In Germany December 14, 1927

6 Claims. (Cl. 308—26)

My invention refers to propeller shafts and more especially to means for supporting same.

The propellers in water and aircraft are frequently required to be arranged at points remote from the engines and in these cases power transmission from the engine to the propeller is effected as a rule by means of a shaft directly connecting them, provided that both the engine and the propeller are disposed in coaxial arrangement, while in the other case intermediate shafts are required which are coupled with the engine and with the propeller shaft proper by means of bevel gears. If the shafts are supported only in two end bearings, as is usual in most cases, there results the drawback, particularly where long shafts are provided, that the range of the numbers of revolution, within which disturbing oscillations of the shaft are liable to arise, are comparatively low and frequently near or below the number of revolutions occurring in practical service. Obviously such oscillations create danger.

According to the present invention this danger is obviated in a particularly reliable manner by supporting the shafts, besides the end bearings, which may have the form of stationary or oscillatory bearings, in intermediate bearings in combination with supports in which the bearings are mounted for radial displacement in any direction and in frictional engagement with their supports, whereby any deflections of the shaft under the influence of centrifugal forces are damped, since the oscillatory energy is consumed by the frictional or other resistance against radial displacement offered by these bearings, with which may also be associated resilient means such as springs adapted to return the bearings and the shaft into alignment with the end bearings.

Such intermediate damping bearings may for instance be formed of bushings surrounding the shaft which are mounted in a stationary casing for free radial movement, means, such as for instance friction or liquid brakes, being provided for damping such radial displacement. Preferably, apart from such braking forces, also elastic forces may be caused to counteract radial displacement by tending to force the bearing and shaft back into their initial position.

In the case where only comparatively weak elastic spars, beams or the like are available for mounting such intermediate bearings, the shaft and supporting means forming in this case two coupled oscillatory systems, the oscillations of both these systems will be mutually damped.

Long and thin high speed shafts are subject to particularly great oscillations and in consequence thereof the damping means are also highly stressed. I therefore prefer providing means for relieving the damping means, for instance by subdividing the shaft lengthwise into a plurality of parts, the length of each of which is such that its critical number of revolutions of the first order still lies above the highest number of revolutions obtained in actual service. The single parts of the shaft are connected with each other by clutches which allow the parts a certain relative movement so that shafts of any desired length can be obtained in which oscillations arise only in the comparatively short parts, which can easily be governed. These parts of the shaft are supported in bearings for radial displacement against the action of damping means and, if desired, also elastic forces.

In the drawings affixed to this specification and forming part thereof arrangements of shafts embodying my invention are illustrated diagrammatically by way of example.

In the drawings,

Fig. 1 is a diagrammatic illustration of the way in which an intermediate shaft is arranged for transmitting power from the engine to the propeller shaft proper, while

Figs. 4 and 5 are an axial section and a cross-section, respectively, on the line V—V in Fig. 4 of a bearing according to this invention adapted to be used as an intermediate bearing for shafts as shown in Figs. 1–3.

Fig. 6 is an axial section of a bearing adapted for the support of a subdivided intermediate shaft.

Fig. 7 is a cross-section on the line VII—VII in Fig. 6.

Figure 1:
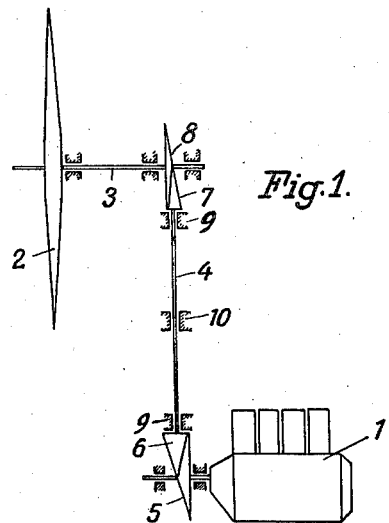
Figure 2:
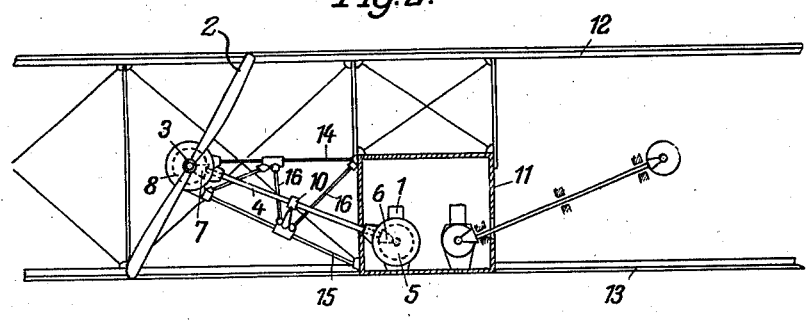
Fig. 2 is an end view, partly in section showing two such propeller drives mounted in an aircraft.

Referring first to Figs. 1 and 2, 1 is the engine, 2 is the propeller, 3 is the propeller shaft and 4 is an intermediate shaft, 5 and 6 being a step-up gearing inserted between the engine and the shaft 4, while 7, 8 is a step-down gearing which reduces the high number of revolutions of the intermediate shaft 4 to the comparatively low number of revolutions of the propeller shaft 3. The intermediate shaft 4 is supported by the usual end bearings 9 and by one or a plurality of intermediate bearings 10, which are provided with damping means as illustrated for instance in Figs. 4 and 5 and are mounted, as shown in Fig. 2 on jibs formed by spars 14, 15 of the fuselage structure and struts 16.

Figure 3:
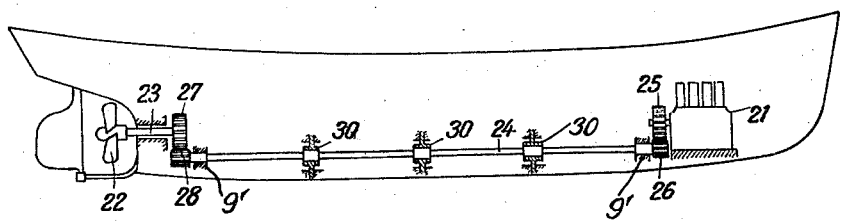
Fig. 3 is a diagrammatic showing partly in longitudinal section of a propeller drive for boats.

In the modification illustrated in Fig. 3 a ship's propeller 22 is driven by the engine 21 by means of an intermediate shaft 24 which is set revolving at materially higher speed than the engine shaft by means of step-up gearing 25, 26 and transmits power to the power shaft 23 by means of step-down gearing 27, 28. Here the intermediate shaft 24 is supported, apart from the end bearings 9', in three intermediate bearings 30. In view of the fact that this shaft can be very thin in proportion to its length, an injurious jamming of the shaft due to a bending of the hull is not likely to occur in spite of the fact that it is supported in a plurality of points. The power transmission gearings 25, 26 and 27, 28 may of course be formed and arranged in such manner, for instance as planet gearings, that the intermediate shaft can be arranged coaxially to the engine and propeller shafts.

The intermediate shaft bearing illustrated by way of example in Figs. 4 and 5 is a rolling bearing consisting of an inner race 31, an outer race 33 and the rolling bodies, which in the present instance are shown as balls. The outer race 33 is arranged for radial displacement in frictional contact with an inner wall of the stationary casing 34 and with a pressure ring 35 forced against it by coil springs 36 mounted in suitable borings of the casing, the frictional pressure thus created acting towards consuming power and thereby damping any radial movement of the shaft.

Whenever an oscillation of the shaft causes the outer race 33 to be displaced radially, a frictional force will be created between the parts 33, 34, and 35 and will effectually damp the oscillation impulses. Leaf springs 37 inserted between the circumferential surface of the ring 33 and the inner wall of the casing 34 tend to maintain the ring 33 in the middle position and offer a steadily increasing resistance to its radial displacement. Pins 38 fixed to the ring 33 and projecting into holes in the springs 37 prevent, together with checks 39 fixed to the casing, angular displacement of the ring 33.

The bearing illustrated by way of example in Figs. 6 and 7 is particularly suitable for the support of the parts of a subdivided intermediate shaft. Two such parts are here shown and are marked 40, 40'. On their ends are mounted coupling claws 41, 41' of rectangular section, which are embraced by a coupling sleeve presenting a rectangular boring to receive the claws. These latter are rounded in axial direction, thereby enabling the partial shafts 40, 40' to execute also angular movements. The bearing proper is arranged exactly as shown in Figs. 4 and 5, similar parts being marked with similar reference numerals primed, and the action of the several parts is also identical. The subdivision of the shaft offers the advantage of raising the critical number of revolutions and avoiding jamming even in the case where the girder 50 supporting the shaft should suffer appreciable changes of form. It is therefore possible to use a very light supporting girder, which may be an ordinary thin-walled tube. The parts of the shaft as well as the intermediate bearings may be standardized so that shafts of any desired length can be produced by combining the required number of partial shafts and intermediate bearings.

In the case where shafts of this kind are exposed to the traveling wind, I prefer enclosing the shaft, bearing and supporting girder in a streamlined envelope 51. I may also mount the bearings 34 within a tube surrounding the shaft 40, 40', but the arrangement shown and described offers the advantage of being more readily mounted in place.

I wish it to be understood that I do not desire to be limited to the exact details of construction shown and described for obvious modifications will occur to a person skilled in the art.

I claim:—

1. The combination, with a long shaft designed for power transmission in axial direction and liable to bend under centrifugal action, of two rigidly mounted bearings supporting the ends of said shaft, a floating bearing supporting said shaft at a point intermediate its ends and power consuming means associated with said floating bearing and arranged for damping radial bending movements of said shaft at said intermediate point.

2. The combination, with a non-rigid structure and a long shaft in said structure designed for power transmission in axial direction and liable to bend under centrifugal action, of two bearings rigidly mounted on said structure and supporting the ends of said shaft, a floating bearing supporting said shaft at a point intermediate its ends and power consuming means associated with said floating bearing and operatively connected with said structure and arranged for damping radial bending movements of said shaft at said intermediate point.

3. The combination, with a long shaft designed for power transmission in axial direction and liable to bend under centrifugal action, of two rigidly mounted bearings supporting the ends of said shaft, a floating bearing supporting said shaft at a point intermediate its ends, resilient means in said floating bearing adapted to return same into alignment with said end bearings, and power consuming means associated with said floating bearing and arranged for damping radial bending movements of said shaft at said intermediate point.

4. The combination, with two shafts endwise jointed in such manner as to allow small relative angular movements, said shafts being designed for axially transmitting power from the outer end of one shaft to the outer end of the other shaft and liable to be radially deflected under centrifugal action, of two rigidly mounted bearings, each supporting the outer end of one shaft, a floating bearing supporting the jointed ends of said shafts and power consuming means associated with said floating bearing and arranged for damping radial movements of said jointed ends.

5. The combination, with a nonrigid structure and two shafts associated with said structure and endwise jointed in such manner as to allow small angular movements, said shafts being designed for axially transmitting power from the outer end of one shaft to the outer end of the other shaft and liable to be radially deflected under centrifugal action, of two bearings rigidly mounted on said structure, each supporting the outer end of one shaft, a floating bearing supporting the jointed ends of said shafts and power consuming means associated with said floating bearing and operatively connected with said structure and arranged for damping radial movements of said jointed ends.

6. The combination, with two shafts endwise jointed in such manner as to allow small relative angular movements, said shafts being designed for axially transmitting power from the outer end of one shaft to the outer end of the other shaft and liable to be radially deflected under centrifugal action, of two rigidly mounted bearings, each supporting the outer end of one shaft, a floating bearing supporting the jointed ends of said shafts, resilient means in said floating bearing adapted to return same into alignment with said end bearings, and power consuming means associated with said floating bearing and arranged for damping radial movements of said jointed ends.

HUGO JUNKERS.